(12) United States Patent
Ho

(10) Patent No.: US 12,372,748 B2
(45) Date of Patent: Jul. 29, 2025

(54) OPTICAL LENS, OPTICAL MODULE, AND ELECTRONIC DEVICE INCLUDING SEVEN LENSES OF −+++−+− REFRACTIVE POWERS

(71) Applicant: VIVO MOBILE COMMUNICATION CO., LTD., Guangdong (CN)

(72) Inventor: Chunyen Ho, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 380 days.

(21) Appl. No.: 18/125,100

(22) Filed: Mar. 22, 2023

(65) Prior Publication Data

US 2023/0236389 A1    Jul. 27, 2023

Related U.S. Application Data

(63) Continuation of application No. PCT/CN2021/119880, filed on Sep. 23, 2021.

(30) Foreign Application Priority Data

Sep. 28, 2020 (CN) .......................... 202011041048.9

(51) Int. Cl.
  *G02B 13/00* (2006.01)
  *G02B 9/64* (2006.01)
  *G02B 13/06* (2006.01)

(52) U.S. Cl.
  CPC ........... *G02B 9/64* (2013.01); *G02B 13/0045* (2013.01); *G02B 13/06* (2013.01)

(58) Field of Classification Search
  CPC ....... G02B 9/64; G02B 13/0045; G02B 13/06
  See application file for complete search history.

(56) References Cited

U.S. PATENT DOCUMENTS

2014/0043694 A1    2/2014  Tsai et al.
2019/0154981 A1    5/2019  Wang et al.
(Continued)

FOREIGN PATENT DOCUMENTS

CN     103592746 A    2/2014
CN     107678130 A    2/2018
(Continued)

OTHER PUBLICATIONS

International Search Report and Written Opinion of the International Searching Authority dated Dec. 6, 2021 as received in Application No. PCT/CN2021/119880.
(Continued)

*Primary Examiner* — Wen Huang
(74) *Attorney, Agent, or Firm* — Price Heneveld LLP

(57) ABSTRACT

This application discloses an optical lens, an optical module, and an electronic device. The optical lens of this application sequentially includes, from an object side to an image side along an optical axis: a first lens with a negative bending force, where an object side surface of the first lens is convex, and an image side surface of the first lens is concave; a second lens with a positive bending force, where an object side surface of the second lens is convex, and an image side surface of the second lens is concave; a third lens with a positive bending force; a fourth lens with a positive bending force and biconvex surfaces; a fifth lens with a negative bending force and biconcave surfaces; a sixth lens with a positive bending force; and a seventh lens with a negative bending force.

20 Claims, 10 Drawing Sheets

(56) References Cited

U.S. PATENT DOCUMENTS

2022/0221692 A1    7/2022  Tang et al.
2024/0126047 A1\*  4/2024  Liao .................. G02B 27/0025

FOREIGN PATENT DOCUMENTS

| CN | 109298515 A | 2/2019 |
|----|-------------|--------|
| CN | 110824676 A | 2/2020 |
| CN | 211014809 U | 7/2020 |
| CN | 112147765 A | 12/2020 |
| CN | 112698484 A | 4/2021 |
| CN | 112764197 A | 5/2021 |
| JP | 6362201 B1  | 7/2018 |

OTHER PUBLICATIONS

CN Office Action dated Jan. 19, 2022 as received in Application No. 202011041048.9.

\* cited by examiner

OPTICAL LENS, OPTICAL MODULE, AND ELECTRONIC DEVICE INCLUDING SEVEN LENSES OF −+++−+− REFRACTIVE POWERS

CROSS-REFERENCE TO RELATED APPLICATIONS

This application is a continuation application of International Application No. PCT/CN2021/119880 filed on Sep. 23, 2021, which claims priority to Chinese Patent Application No. 202011041048.9 filed in China on Sep. 28, 2020, which is incorporated herein by reference in its entirety.

TECHNICAL FIELD

This application pertains to the field of communications device technologies, and in particular, to an optical lens, an optical module, and an electronic device.

BACKGROUND

At present, with the continuous development of mobile communication technology and the widespread application of intelligent electronic devices (such as mobile phones), the requirements for cameras of intelligent electronic devices are higher and higher, and lenses with a plurality of focal lengths may also be configured on intelligent electronic devices. The wide-angle lens is required to have low distortion, larger angle of view, and higher pixel. As a result, the ultra wide lens comes into being.

In order to have a large angle of view, the ultra wide lens needs a small equivalent focal length, while in order to have high image quality, the ultra wide lens needs a large-size photosensitive element. However, at present, the intelligent electronic device cannot satisfy the requirements on the equivalent focal length and the size of the photosensitive element in the configuration of the ultra wide lens at the same time, to achieve high image quality at a large angle of view.

SUMMARY

Embodiments of this application provide an optical lens, an optical module, and an electronic device.

To resolve the foregoing technical problem, this application is implemented as follows:

According to a first aspect, an embodiment of this application provides an optical lens, sequentially including, from an object side to an image side along an optical axis:

a first lens with a negative bending force, where an object side surface of the first lens is convex, and an image side surface of the first lens is concave;

a second lens with a positive bending force, where an object side surface of the second lens is convex, and an image side surface of the second lens is concave;

a third lens with a positive bending force, where an object side surface of the third lens is convex, and an image side surface of the third lens is concave;

a fourth lens with a positive bending force, where both an object side surface and an image side surface of the fourth lens are convex;

a fifth lens with a negative bending force, where both an object side surface and an image side surface of the fifth lens are concave;

a sixth lens with a positive bending force, where an object side surface of the sixth lens is concave, and an image side surface of the sixth lens is convex;

a seventh lens with a negative bending force, where an object side surface of the seventh lens includes a first bending portion and a second bending portion, the first bending portion and the second bending portion are connected to form a convex surface, and an image side surface of the seventh lens includes a third bending portion and a fourth bending portion, and the third bending portion and the fourth bending portion are connected to form a concave surface;

the optical lens satisfies the following relational expressions:

$0.7 < V1/V2 < 5.2;$ $0.1 < V2/V3 < 0.6;$ $0.2 < V3/V4 < 1.8;$ $0.7 < V4/V5 < 5.2;$ $0.1 < V5/V6 < 0.6;$ $0.6 < V6/V7 < 4.2;$ and $N1 < N2, N2 > N3, N4 < N5, N6 < N5, N6 < N7$, where V1 is a dispersion coefficient of the first lens, V2 is a dispersion coefficient of the second lens, V3 is a dispersion coefficient of the third lens, V4 is a dispersion coefficient of the fourth lens, V5 is a dispersion coefficient of the fifth lens, V6 is a dispersion coefficient of the sixth lens, V7 is a dispersion coefficient of the seventh lens, N1 is a refractive index of the first lens, N2 is a refractive index of the second lens, N3 is a refractive index of the third lens, N4 is a refractive index of the fourth lens, N5 is a refractive index of the fifth lens, N6 is a refractive index of the sixth lens, and N7 is a refractive index of the seventh lens.

According to a second aspect, an embodiment of this application provides an optical module, including:

the optical lens as described in the foregoing embodiment;
a photosensitive element; and
a light filter arranged between a seventh lens of the optical lens and the photosensitive element.

According to a third aspect, an embodiment of this application further provides an electronic device, including the optical module as described in the foregoing embodiment.

In the embodiments of this application, the optical lens sequentially includes, from an object side to an image side along an optical axis: a first lens with a negative bending force, where an object side surface of the first lens is convex, and an image side surface of the first lens is concave; a second lens with a positive bending force, where an object side surface of the second lens is convex, and an image side surface of the second lens is concave; a third lens with a positive bending force, where an object side surface of the third lens is convex, and an image side surface of the third lens is concave; a fourth lens with a positive bending force, where both an object side surface and an image side surface of the fourth lens are convex; a fifth lens with a negative bending force, where both an object side surface and an image side surface of the fifth lens are concave; a sixth lens with a positive bending force, where an object side surface of the sixth lens is concave, and an image side surface of the sixth lens is convex; and a seventh lens with a negative bending force, where an object side surface of the seventh lens includes a first bending portion and a second bending portion, the first bending portion and the second bending portion are connected to form a convex surface, and an image side surface of the seventh lens includes a third bending portion and a fourth bending portion, and the third bending portion and the fourth bending portion are connected to form a concave surface. In this way, the optical lens with the above structure can satisfy the requirements on the equivalent focal length and the size of the photosensitive element at the same time, and the optical lens can be used to shoot a picture with large angle of view and high image quality, thus meeting shooting requirements of the user.

DESCRIPTION OF EMBODIMENTS

The following clearly describes the technical solutions in the embodiments of this application in conjunction with the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the description and the claims of this application are used to distinguish between similar objects instead of describing a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and a character "/" generally represents an "or" relationship between associated objects.

Before describing the optical lens of the embodiments of this application in detail, in order to facilitate understanding, a conversion relationship between the equivalent focal length and the field of view (FOV) is briefly explained, as shown in Table 1.

TABLE 1

| Equivalent focal length (mm) | DFOV (degree) | HFOV (degree) |
|---|---|---|
| 11.0 | 126.1 | 117.1 |
| 12.0 | 122 | 112.6 |
| 13.0 | 118.0 | 108.3 |
| 14.0 | 114.2 | 104.3 |
| 15.0 | 110.5 | 100.4 |
| 16.0 | 107.0 | 96.7 |
| 17.0 | 103.7 | 93.3 |
| 18.0 | 100.5 | 90.0 |

The DFOV represents a horizontal field of view, and the DFOV represents a vertical field of view.

As can be seen from the above table, a smaller equivalent focal length herein indicates a larger field of view. In addition, a larger size of the photosensitive element indicates high image quality of the picture. However, the existing electronic device has a dilemma in the configuration of ultra wide lens, that is, the requirements on the equivalent focal length and the size of the photosensitive element cannot be satisfied at the same time to achieve high image quality at a large angle of view.

To solve the foregoing problem, an embodiment of this application provides an optical lens, an optical module, and an electronic device.

With reference to the accompanying drawings, the following describes in detail an optical lens in the embodiments of this application based on specific embodiments and application scenarios thereof.

Figure 1:
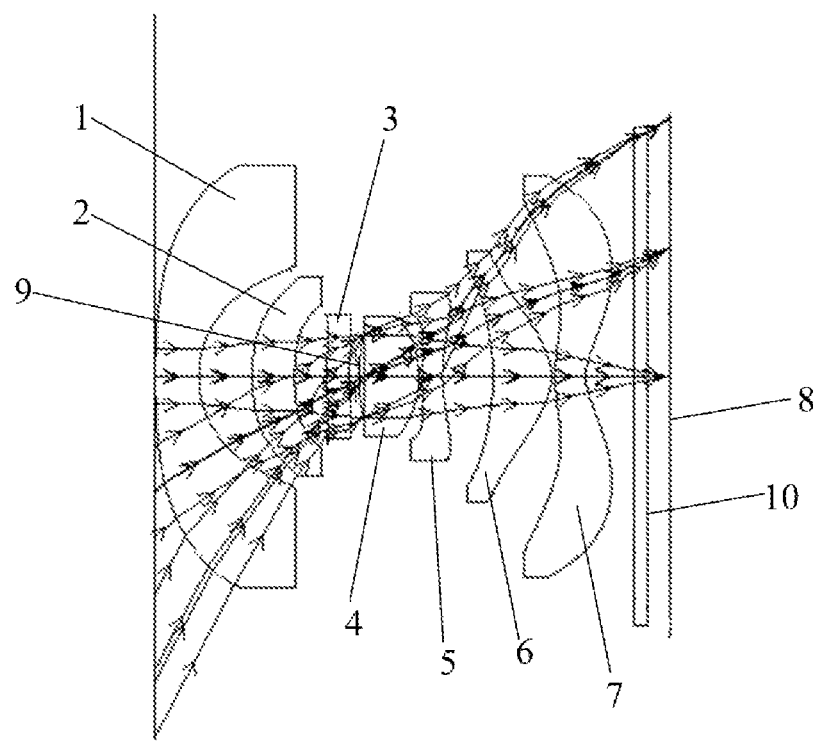
FIG. 1 is a schematic diagram of a hardware structure of an optical lens according to an embodiment of this application.

As shown in FIG. 1, FIG. 1 is a schematic diagram of a hardware structure of an optical lens according to an embodiment of this application. The optical lens sequentially includes, from an object side to an image side along an optical axis:

a first lens 1 with a negative bending force, where an object side surface of the first lens 1 is convex, and an image side surface of the first lens 1 is concave;

a second lens 2 with a positive bending force, where an object side surface of the second lens 2 is convex, and an image side surface of the second lens 2 is concave;

a third lens 3 with a positive bending force, where an object side surface of the third lens 3 is convex, and an image side surface of the third lens 3 is concave;

a fourth lens 4 with a positive bending force, where both an object side surface and an image side surface of the fourth lens 4 are convex;

a fifth lens 5 with a negative bending force, where both an object side surface and an image side surface of the fifth lens 5 are concave;

a sixth lens 6 with a positive bending force, where an object side surface of the sixth lens 6 is concave, and an image side surface of the sixth lens 6 is convex;

a seventh lens 7 with a negative bending force, where an object side surface of the seventh lens 7 includes a first bending portion and a second bending portion, the first bending portion and the second bending portion are connected to form a convex surface, and an image side surface of the seventh lens 7 includes a third bending portion and a fourth bending portion, and the third bending portion and the fourth bending portion are connected to form a concave surface;

the optical lens satisfies the following relational expressions:

$0.7 < V1/V2 < 5.2;$ $0.1 < V2/V3 < 0.6;$ $0.2 < V3/V4 < 1.8;$ $0.7 < V4/V5 < 5.2;$ $0.1 < V5/V6 < 0.6;$ $0.6 < V6/V7 < 4.2;$ and $N1 < N2, N2 > N3, N4 < N5, N6 < N5, N6 < N7$, where V1 is a dispersion coefficient of the first lens 1, V2 is a dispersion coefficient of the second lens 2, V3 is a dispersion coefficient of the third lens 3, V4 is a dispersion coefficient of the fourth lens 4, V5 is a dispersion coefficient of the fifth lens 5, V6 is a dispersion coefficient of the sixth lens 6, V7 is a dispersion coefficient of the seventh lens 7, N1 is a refractive index of the first lens 1, N2 is a refractive index of the second lens 2, N3 is a refractive index of the third lens 3, N4 is a refractive index of the fourth lens 4, N5 is a refractive index of the fifth lens 5, N6 is a refractive index of the sixth lens 6, and N7 is a refractive index of the seventh lens 7.

It should be noted that the object side surface of the lens specifically refers to a surface away from the photosensitive element, and the image side surface of the lens specifically refers to a surface close to the photosensitive element.

It should be noted that the object side surface of the seventh lens 7 includes a first bending portion and a second bending portion, the first bending portion and the second bending portion are connected to form a convex surface, and an image side surface of the seventh lens 7 includes a third bending portion and a fourth bending portion, and the third bending portion and the fourth bending portion are connected to form a concave surface. This indicates that the seventh lens has two curvature inversions, so that a chief ray angle (CRA) of the photosensitive element 8 arranged on the image side surface of the seventh lens can be satisfied.

N1<N2 herein indicates that the first lens 1 is a lens with low refractive index, and the second lens 2 is a lens with high refractive index, which can reduce the cost and may not destroy dispersion; N2>N3 indicates that the second lens 2 is a lens with high refractive index, and the third lens 3 is a lens with low refractive index, which can reduce the cost and may not destroy dispersion; N4<N5 indicates that the third lens 3 and the fourth lens 4 are both lenses with low refractive index, which can reduce the cost; the fourth lens 4 is a lens with low refractive index, and the fifth lens 5 is a lens with high refractive index, which can reduce the cost and may not destroy dispersion; N6<N5 indicates that the fifth lens 5 is a lens with high refractive index, and the sixth lens 6 is a lens with low refractive index, which can reduce the cost and may not destroy dispersion; N6<N7 indicates that the sixth lens 6 is a lens with low refractive index, and the seventh lens 7 is a lens with high refractive index, which can reduce the cost and may not destroy dispersion.

The optical lens in the embodiments of this application sequentially includes, from an object side to an image side along an optical axis: a first lens with a negative bending force, where an object side surface of the first lens is convex, and an image side surface of the first lens is concave; a second lens with a positive bending force, where an object side surface of the second lens is convex, and an image side surface of the second lens is concave; a third lens with a positive bending force, where an object side surface of the third lens is convex, and an image side surface of the third lens is concave; a fourth lens with a positive bending force, where both an object side surface and an image side surface of the fourth lens are convex; a fifth lens with a negative bending force, where both an object side surface and an image side surface of the fifth lens are concave; a sixth lens with a positive bending force, where an object side surface of the sixth lens is concave, and an image side surface of the sixth lens is convex; and a seventh lens with a negative bending force, where an object side surface of the seventh lens includes a first bending portion and a second bending portion, the first bending portion and the second bending portion are connected to form a convex surface, and an image side surface of the seventh lens includes a third bending portion and a fourth bending portion, and the third bending portion and the fourth bending portion are connected to form a concave surface. In this way, the optical lens with the above structure can satisfy the requirements on the equivalent focal length and the size of the photosensitive element at the same time, and the optical lens can be used to shoot a picture with large angle of view and high image quality, thus meeting shooting requirements of the user.

As an optional implementation, the optical lens satisfies the following relational expressions:

$8.6 \text{ mm} < R1 < 23.1 \text{ mm}, 0.9 \text{ mm} < R2 < 2.5 \text{ mm};$ $2.0 \text{ mm} < R3 < 5.3 \text{ mm}, 2.6 \text{ mm} < R4 < 7.0 \text{ mm};$ $2.5 \text{ mm} < R5 < 6.8 \text{ mm}, 4.0 \text{ mm} < R6 < 10.7 \text{ mm};$ $1.9 \text{ mm} < R7 < 5.2 \text{ mm}, -0.8 \text{ mm} < R8 < -2.2 \text{ mm};$ $3.8 \text{ mm} < R9 < 10.2 \text{ mm}, 1.4 \text{ mm} < R10 < 3.6 \text{ mm};$ $2.1 \text{ mm} < R11 < -5.7 \text{ mm}, -0.5 \text{ mm} < R12 < -1.3 \text{ mm};$ and $1.6 \text{ mm} < R13 < 4.2 \text{ mm}, 0.5 \text{ mm} < R14 < 1.3 \text{ mm},$ where R1 is a radius of the object side surface of the first lens 1, R2 is a radius of the image side surface of the first lens 1, R3 is a radius of the object side surface of the second lens 2, R4 is a radius of the image side surface of the second lens 2, R5 is a radius of the object side surface of the third lens 3, R6 is a radius of the image side surface of the third lens 3, R7 is a radius of the object side surface of the fourth lens 4, R8 is a radius of the image side surface of the fourth lens 4, R9 is a radius of the object side surface of the fifth lens 5, R10 is a radius of the image side surface of the fifth lens 5, R11 is a radius of the object side surface of the sixth lens 6, R12 is a radius of the image side surface of the sixth lens 6, R13 is a radius of the object side surface of the seventh lens 7, and R14 is a radius of the image side surface of the seventh lens 7.

It should be noted that 8.6 mm<R1<23.1 mm, and the object side surface of the first lens 1 is convex, so that a ghost image-like stray light can be effectively avoided, and the dispersion can be effectively suppressed by using a lens with low refractive index.

Further, the optical lens satisfies the following relational expressions:

$-2.9 \text{ mm} < f1 < -4.4 \text{ mm}; 15 \text{ mm} < f2 < 22.8 \text{ mm}, 18.5$
$\text{mm} < f3 < 28.1 \text{ mm}, 1.7 \text{ mm} < f4 < 2.6 \text{ mm}, -4.8$ mm<$f5$<−7.4 mm,1.6 mm<$f6$<2.4 mm,−1.7 mm<$f7$<−2.6 mm, where f1 is a focal length of the first lens 1, f2 is a focal length of the second lens 2, f3 is a focal length of the third lens 3, f4 is a focal length of the fourth lens 4, f5 is a focal length of the fifth lens 5, f6 is a focal length of the sixth lens 6, and f7 is a focal length of the seventh lens 7; and the optical lens further includes an aperture 9 arranged between the third lens 3 and the fourth lens 4.

It should be noted that the aperture 9 is arranged between the third lens 3 and the fourth lens 4, to effectively control an aberration and to be of good manufacturing sensitivity, that is, to have a relatively large field of view and image height size.

The optical module herein including the optical lens includes a light filter 10 which is located between the seventh lens 7 and the photosensitive element 8. The light filter 10 may be an infrared light filter, which is suitable for the photosensitive element 8 with a diagonal length from 8.0 mm to 8.4 mm for effective imaging, and is suitable for visible light with a wavelength range from 400 nm to 700 nm.

Further, the optical lens satisfies the following relational expressions:

0.6 mm<CT1<0.8 mm, 0.5 mm<CT2<0.8 mm, 0.3 mm<CT3<0.4 mm, 0.8 mm<CT4<1.1 mm, 0.3 mm<CT5<0.4 mm, 0.8 mm<CT6<1.0 mm, 0.4 mm<CT7<0.5 mm, where CT1 is a central thickness of the first lens 1 on the optical axis, CT2 is a central thickness of the second lens 2 on the optical axis, CT3 is a central thickness of the third lens 3 on the optical axis, CT4 is a central thickness of the fourth lens 4 on the optical axis, CT5 is a central thickness of the fifth lens 5 on the optical axis, CT6 is a central thickness of the sixth lens 6 on the optical axis, and CT7 is a central thickness of the seventh lens 7 on the optical axis.

Figure 2:
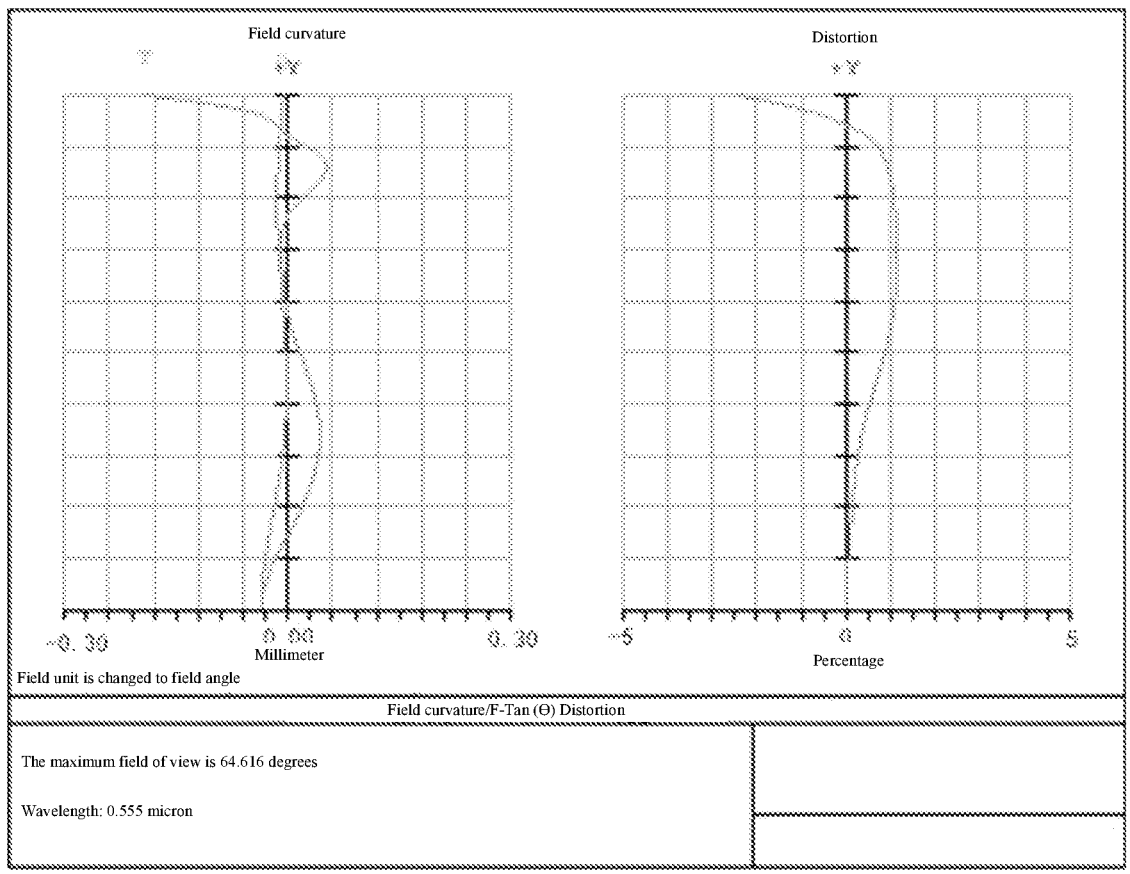
FIG. 2 is a first schematic diagram of a field curvature/distortion curve of an optical lens according to an embodiment of this application.
Figure 3:
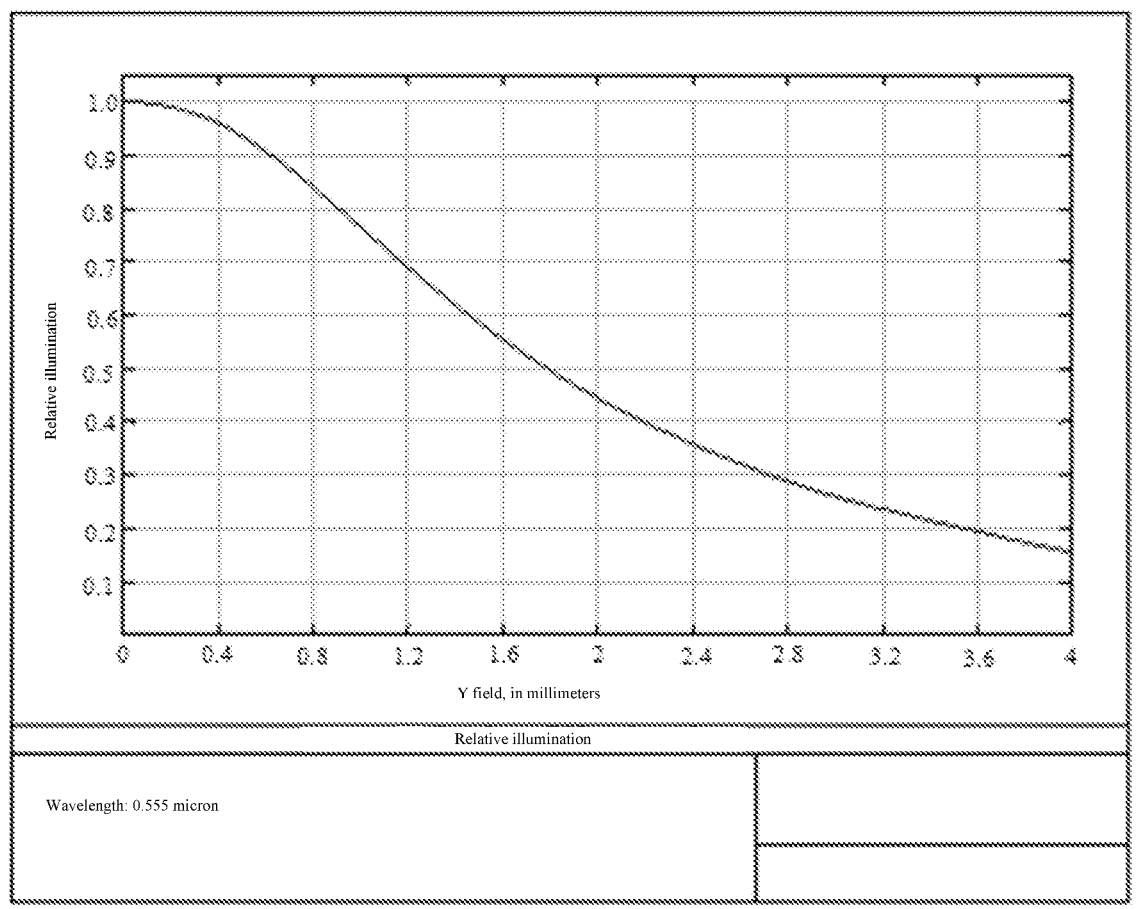
FIG. 3 is a first curve chart of a relative illumination of an optical lens according to an embodiment of this application.
Figure 4:
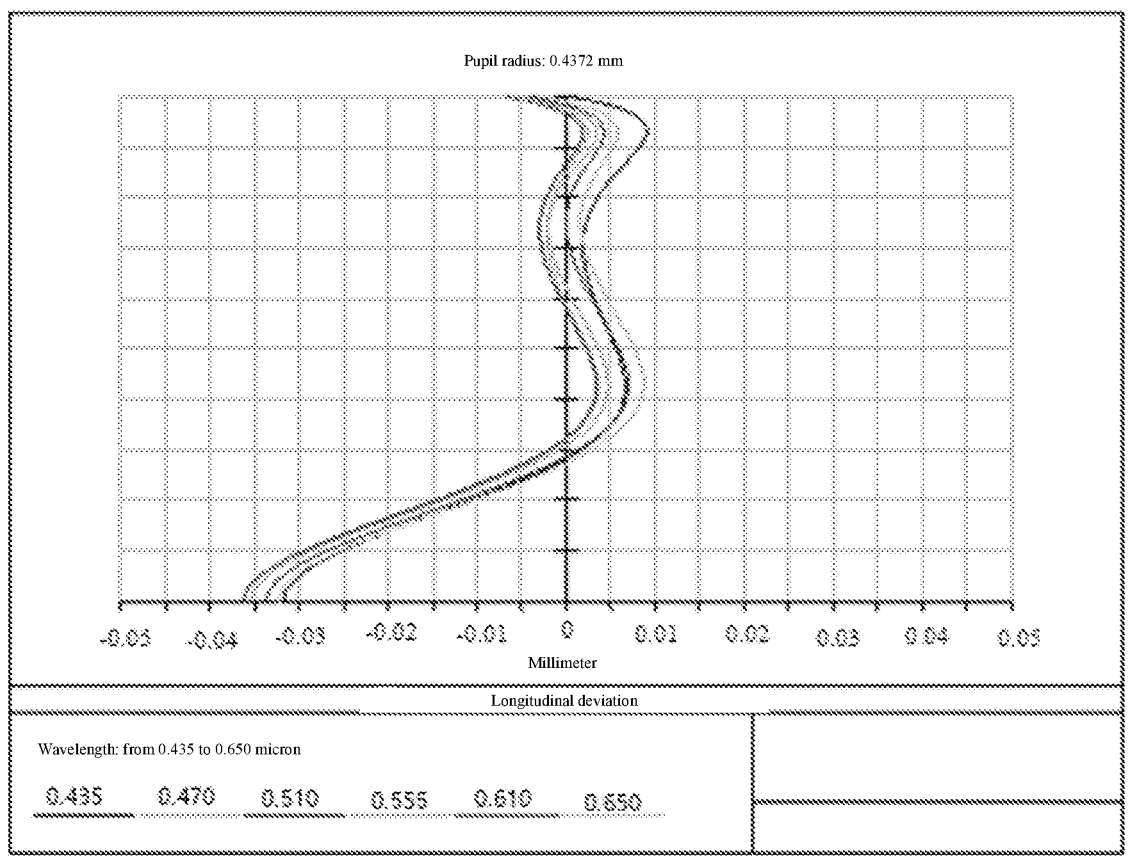
FIG. 4 is a first curve chart of a longitudinal deviation of an optical lens according to an embodiment of this application.

In this implementation, an optical lens meeting the foregoing size range is adopted with a small optical distortion. Specifically, −2.5%<Optical distortion<1.5%, which is corresponding to the field of view distortion diagram shown in FIG. 2. Relative illumination>14.5%, as shown in FIG. 3. See FIG. 4 for on-axis chromatic aberration, HFOV=117 degrees, F2.2, 1.9 mm<focal length EFL<2.0 mm.

An aspheric equation used is as follows, and parameters in specific implementation are shown in Table 2 in mm. Conic is a value of k in the aspheric equation.

TABLE 2

$$z = \frac{cr^2}{1+\sqrt{1-(1+k)c^2r^2}} + \sum_{i=1}^{N} \alpha_i \rho^{2i}$$

| Annotation | Curvature radius | Thickness | Radius | Conic | Material Nd/Abbe |
|---|---|---|---|---|---|
| Lens 1 | 15.01 | 0.612 | 3.265 | 17.795 | 1.54/55.98 |
|  | 1.60 | 0.761 | 1.719 | −1.533 |  |
| Lens 2 | 3.45 | 0.599 | 1.547 | 1.818 | 1.67/19.24 |
|  | 4.56 | 0.453 | 1.114 | 7.350 |  |
| Lens 3 | 4.40 | 0.321 | 0.966 | −24.910 | 1.54/55.98 |
|  | 6.93 | 0.203 | 0.828 | −85.682 |  |
| Aperture |  | −0.067 | 0.646 |  |  |
| Lens 4 | 3.37 | 0.856 | 0.697 | 3.754 | 1.54/55.98 |
|  | −1.41 | 0.041 | 0.928 | −19.291 |  |
| Lens 5 | 6.64 | 0.289 | 0.991 | −4.772 | 1.67/19.24 |
|  | 2.35 | 0.719 | 1.313 | −7.597 |  |
| Lens 6 | −3.68 | 0.826 | 1.669 | 0.647 | 1.54/55.98 |
|  | −0.83 | 0.050 | 1.956 | 4.529 |  |
| Lens 7 | 2.74 | 0.437 | 2.755 | −0.269 | 1.64/23.53 |
|  | 0.81 | 0.674 | 3.110 | −5.912 |  |
| Light filter |  | 0.210 | 3.782 |  |  |

| A4 | A6 | A8 | A10 | A12 | A14 | A16 |
|---|---|---|---|---|---|---|
| 1.8339E−03 | 2.2147E−03 | −6.0843E−04 | 8.3238E−05 | −5.7770E−06 | 1.6794E−07 | −5.6031E−13 |
| 2.5098E−02 | −4.6840E−03 | 2.2060E−02 | −1.1149E−02 | 3.6892E−03 | −5.9192E−04 | 7.4488E−08 |
| 4.1047E−02 | 1.8275E−02 | −1.1405E−02 | 1.6662E−02 | −1.0978E−02 | 1.8656E−03 | 5.2744E−05 |
| 1.3537E−01 | −3.0940E−02 | 1.4103E−01 | −1.6805E−01 | 7.1396E−02 | −4.0643E−03 | 1.7491E−04 |
| 2.0545E−04 | −1.2972E−01 | −1.6076E−01 | 3.1034E−01 | −1.9782E−01 | 6.1971E−02 | −7.2758E−05 |
| −1.9872E−04 | −1.3382E−01 | −3.0066E−01 | 1.0694E+00 | −1.2959E+00 | 7.0572E−01 | 5.9128E−03 |
| 7.8232E−02 | −1.8809E−01 | 5.2884E−01 | −1.0490E+00 | 7.8666E−01 | 8.6371E−02 | −1.7317E−04 |
| −4.5728E−01 | 8.5520E−01 | −1.2596E+00 | 1.0490E+00 | −4.3592E−01 | 1.1613E−02 | 1.5072E−02 |
| −4.6017E−05 | −7.3935E−01 | 2.0227E+00 | −3.2921E+00 | 2.7900E+00 | −1.0456E+00 | −3.6702E−04 |
| −9.7555E−02 | 5.8877E−02 | −3.7789E−02 | 1.1004E−02 | −1.1098E−03 | 4.0874E−05 | −8.5527E−06 |
| 4.8400E−02 | −3.0615E−02 | 6.1340E−03 | 1.0727E−03 | −1.0320E−04 | −1.2568E−04 | 1.4613E−06 |
| −9.1610E−02 | 7.8088E−02 | −4.2164E−02 | 1.5828E−02 | −3.2432E−03 | 2.6100E−04 | −8.9580E−08 |
| −1.3384E−01 | 3.3464E−02 | −5.7284E−03 | 7.0544E−04 | −6.6428E−05 | 4.2712E−06 | −1.3273E−07 |
| −5.3309E−02 | 1.3200E−02 | −2.4535E−03 | 2.6960E−04 | −1.4725E−05 | 1.0536E−07 | 1.4849E−08 |

As an optional implementation, the optical lens satisfies the following relational expressions:

4.1 mm<$R1$<11 mm,0.9 mm<$R2$<2.4 mm;

2.2 mm<$R3$<5.8 mm,2.6 mm<$R4$<7.1 mm;

2.5 mm<$R5$<6.7 mm,4.2 mm<$R6$<11.2 mm;

2.0 mm<$R7$<5.4 mm,−0.8 mm<$R8$<−2.1 mm;

4.0 mm<$R9$<10.6 mm,1.4 mm<$R10$<3.6 mm;

−1.7 mm<R11<−4.6 mm,−0.5 mm<R12<−1.3 mm; and 1.6 mm<R13<4.4 mm,0.5 mm<R14<1.2 mm, where R1 is a radius of the object side surface of the first lens 1, R2 is a radius of the image side surface of the first lens 1, R3 is a radius of the object side surface of the second lens 2, R4 is a radius of the image side surface of the second lens 2, R5 is a radius of the object side surface of the third lens 3, R6 is a radius of the image side surface of the third lens 3, R7 is a radius of the object side surface of the fourth lens 4, R8 is a radius of the image side surface of the fourth lens 4, R9 is a radius of the object side surface of the fifth lens 5, R10 is a radius of the image side surface of the fifth lens 5, R11 is a radius of the object side surface of the sixth lens 6, R12 is a radius of the image side surface of the sixth lens 6, R13 is a radius of the object side surface of the seventh lens 7, and R14 is a radius of the image side surface of the seventh lens 7.

It should be noted that 4.1 mm<R1<11 mm, and the object side surface of the first lens 1 is convex, so that a ghost image-like stray light can be effectively avoided, and the dispersion can be effectively suppressed by using a lens with low refractive index.

Further, the optical lens satisfies the following relational expressions:

−3.3 mm<f1<−5.1 mm;21.6 mm<f2<32.9 mm,16.7 mm<f3<25.5 mm,1.7 mm<f4<2.6 mm,−4.8 mm<f5<−7.3 mm,1.6 mm<f6<2.4 mm,−1.7 mm<f7<−2.5 mm, where f1 is a focal length of the first lens 1, f2 is a focal length of the second lens 2, f3 is a focal length of the third lens 3, f4 is a focal length of the fourth lens 4, f5 is a focal length of the fifth lens 5, f6 is a focal length of the sixth lens 6, and f7 is a focal length of the seventh lens 7; and the optical lens further includes an aperture arranged between the third lens 3 and the fourth lens 4.

It should be noted that the aperture 9 is arranged between the third lens 3 and the fourth lens 4, to effectively control an aberration and to be of good manufacturing sensitivity, that is, to have a relatively large field of view and image height size.

The optical module herein including the optical lens includes a light filter 10 which is located between the seventh lens 7 and the photosensitive element 8. The light filter 10 may be an infrared light filter, which is suitable for the photosensitive element 8 with a diagonal length from 8.0 mm to 8.4 mm for effective imaging, and is suitable for visible light with a wavelength range from 400 nm to 700 nm.

Further, the optical lens satisfies the following relational expressions:

0.3 mm<CT1<0.5 mm;0.5 mm<CT2<0.7 mm,0.3 mm<CT3<0.4 mm,0.8 mm<CT4<1.1 mm,0.3 mm<CT5<0.4 mm,0.8 mm<CT6<1.1 mm,0.4 mm<CT7<0.6 mm, where CT1 is a central thickness of the first lens 1 on the optical axis, CT2 is a central thickness of the second lens 2 on the optical axis, CT3 is a central thickness of the third lens 3 on the optical axis, CT4 is a central thickness of the fourth lens 4 on the optical axis, CT5 is a central thickness of the fifth lens 5 on the optical axis, CT6 is a central thickness of the sixth lens 6 on the optical axis, and CT7 is a central thickness of the seventh lens 7 on the optical axis.

Figure 5:
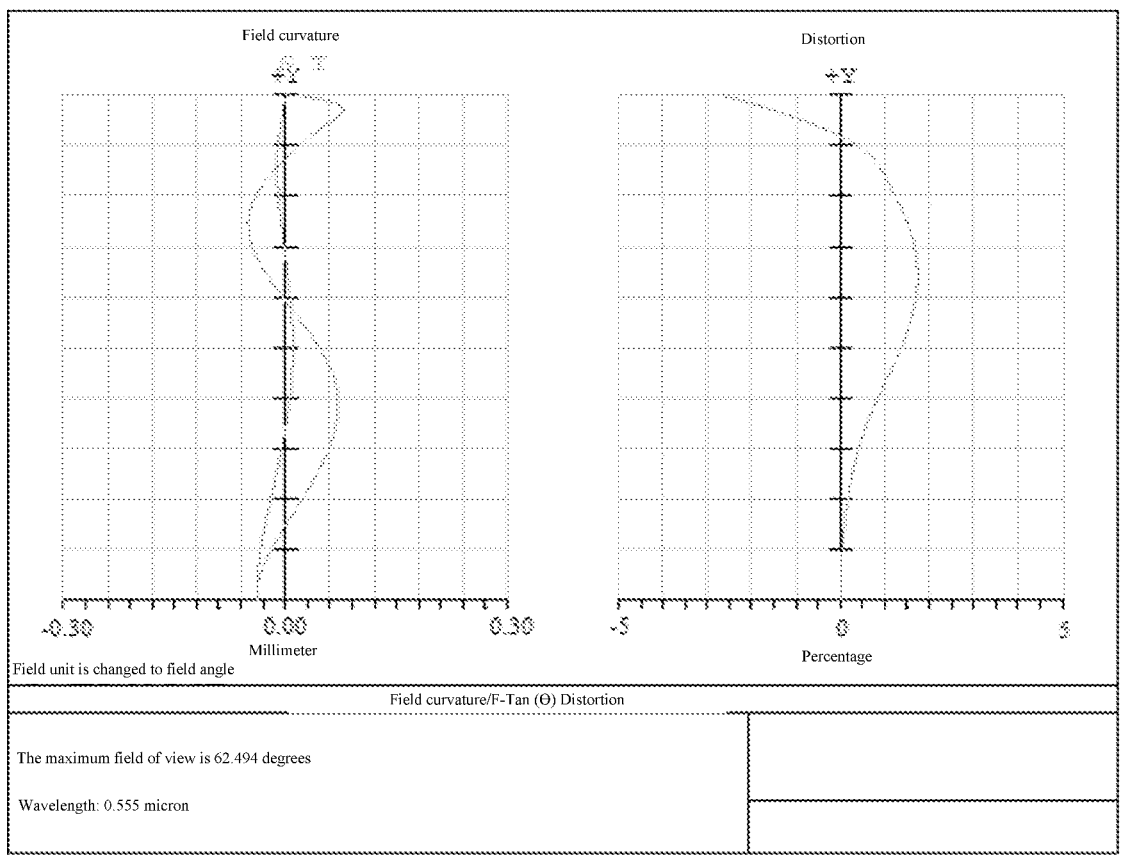
FIG. 5 is a second schematic diagram of a field curvature/distortion curve of an optical lens according to an embodiment of this application.
Figure 6:
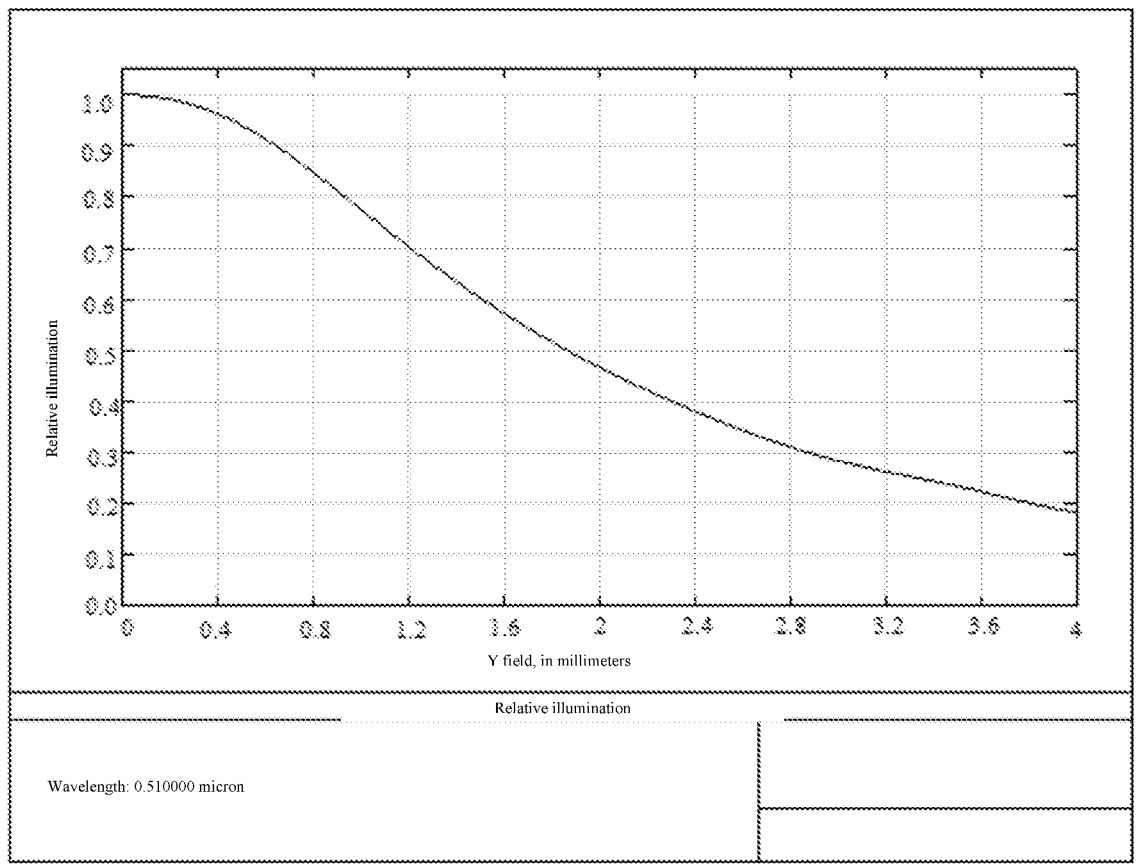
FIG. 6 is a second curve chart of a relative illumination of an optical lens according to an embodiment of this application.
Figure 7:
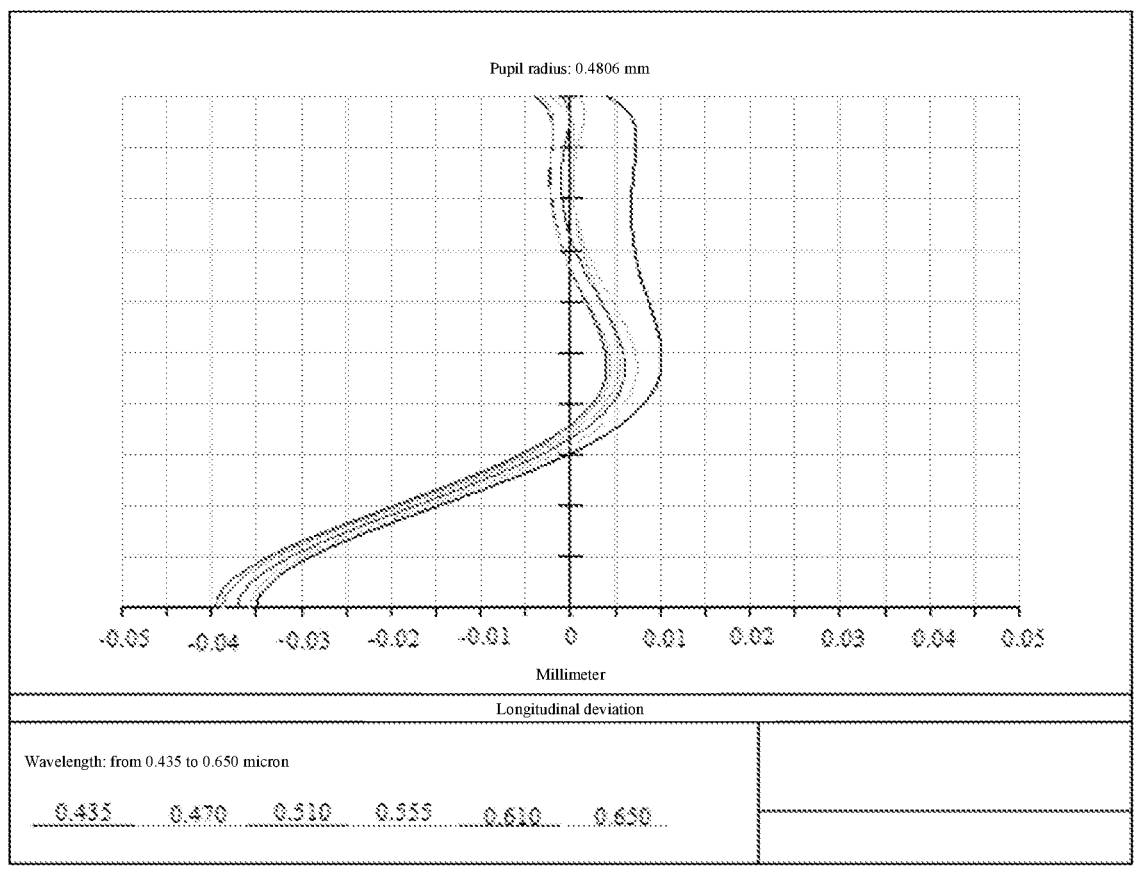
FIG. 7 is a second curve chart of a longitudinal deviation of an optical lens according to an embodiment of this application.

In this implementation, an optical lens meeting the foregoing size range is adopted with a small optical distortion. Specifically, −3%<Optical distortion<2%, which is corresponding to the field of view distortion diagram shown in FIG. 5. Relative illumination>17.5%, as shown in FIG. 6. See FIG. 7 for on-axis chromatic aberration, HFOV=112 degrees, F2.2, 1.9 mm<focal length EFL<2.2 mm.

An aspheric equation used is as follows, and parameters in specific implementation are shown in Table 3 in mm.

Conic is a value of k in the aspheric equation.

TABLE 3

$$z = \frac{cr^2}{1 + \sqrt{1 - (1+k)c^2r^2}} + \sum_{i=1}^{N} \alpha_i \rho^{2i}$$

| Annotation | Curvature radius | Thickness | Radius | Conic | Material Nd/Abbe |
|---|---|---|---|---|---|
| Lens 1 | 7.147 | 0.383 | 2.813 | 5.197 | 1.54/55.98 |
|  | 1.585 | 0.740 | 1.658 | −1.602 |  |
| Lens 2 | 3.782 | 0.549 | 1.446 | 4.922 | 1.67/19.24 |
|  | 4.598 | 0.405 | 1.000 | 20.075 |  |
| Lens 3 | 4.356 | 0.309 | 0.962 | 0.319 | 1.54/55.98 |
|  | 7.285 | 0.223 | 0.847 | −66.625 |  |
| Aperture |  | −0.067 | 0.681 |  |  |
| Lens 4 | 3.519 | 0.905 | 0.710 | −22.303 | 1.54/55.98 |
|  | −1.391 | 0.045 | 0.943 | −13.086 |  |
| Lens 5 | 6.889 | 0.312 | 1.006 | −156.166 | 1.67/19.24 |
|  | 2.353 | 0.719 | 1.381 | 0.136 |  |
| Lens 6 | −2.966 | 0.884 | 1.620 | −0.108 | 1.54/55.98 |
|  | −0.817 | 0.044 | 1.941 | −4.353 |  |
| Lens 7 | 2.834 | 0.450 | 2.885 | −0.143 | 1.64/23.53 |
|  | 0.802 | 0.690 | 3.235 | −5.808 |  |
| Light filter |  | 0.210 | 3.956 |  |  |

| A4 | A6 | A8 | A10 | A12 | A14 | A16 |
|---|---|---|---|---|---|---|
| −3.1866E−03 | 2.4055E−03 | −5.0869E−04 | 7.7565E−05 | −7.4400E−06 | 3.3069E−07 | 0.0000E+00 |
| 3.2111E−02 | −9.6591E−03 | 2.2761E−02 | −1.3793E−02 | 5.3743E−03 | −8.1370E−04 | 0.0000E+00 |
| 5.9161E−02 | 9.9495E−03 | −9.6578E−03 | 1.1162E−02 | 4.6391E−03 | 1.4396E−04 | 0.0000E+00 |
| 1.6723E−01 | −5.4682E−02 | 1.0317E−01 | −1.0234E−02 | −8.8537E−02 | 5.0503E−02 | 0.0000E+00 |

TABLE 3-continued

| | | | | | | |
|---|---|---|---|---|---|---|
| 0.0000E+00 | −1.4135E−01 | −7.1823E−02 | 7.2738E−02 | 4.8641E−02 | −2.1814E−02 | 0.0000E+00 |
| 0.0000E+00 | −1.7030E−01 | −1.8737E−02 | 7.5699E−02 | 2.0194E−01 | −1.4507E−01 | 0.0000E+00 |
| 1.4491E−01 | −1.9148E−01 | 2.1718E−01 | −1.1065E−01 | −1.6275E−01 | 1.8832E−01 | 0.0000E+00 |
| −3.5093E−01 | 4.7545E−01 | −5.3545E−01 | 2.3137E−01 | 5.0934E−02 | −7.1480E−02 | 0.0000E+00 |
| 0.0000E+00 | −3.4307E−01 | 5.3895E−01 | −6.3597E−01 | 4.1154E−01 | −1.6423E−01 | 0.0000E+00 |
| −1.5034E−01 | 7.6507E−02 | −5.0865E−02 | 2.1449E−02 | −4.4636E−03 | 2.7813E−04 | 0.0000E+00 |
| 3.3667E−02 | −3.6280E−02 | 1.3371E−02 | 1.1740E−03 | −9.8002E−04 | 1.8640E−05 | 0.0000E+00 |
| −1.0410E−01 | 7.0592E−02 | −3.9138E−02 | 1.6280E−02 | −3.5053E−03 | 2.8577E−04 | 0.0000E+00 |
| −1.3033E−01 | 3.3647E−02 | −5.8960E−03 | 6.9555E−04 | −6.4353E−05 | 4.6283E−06 | −1.7408E−07 |
| −4.8125E−02 | 1.2079E−02 | −2.2631E−03 | 2.5432E−04 | −1.4800E−05 | 1.8861E−07 | 1.0882E−08 |

As an optional implementation, the optical lens satisfies the following relational expressions:

8.6 mm<R1<23 mm,0.9 mm<R2<2.5 mm;

2.0 mm<R3<5.2 mm,2.5 mm<R4<6.8 mm;

2.6 mm<R5<7 mm,3.8 mm<R6<10.1 mm;

1.9 mm<R7<5 mm,−0.8 mm<R8<−2.2 mm;

4.6 mm<R9<12.3 mm,1.4 mm<R10<3.8 mm;

−2 mm<R11<−5.5 mm,−0.5 mm<R12<−1.3 mm; and 1.6 mm<R13<4.3 mm,0.5 mm<R14<1.3 mm, where R1 is a radius of the object side surface of the first lens 1, R2 is a radius of the image side surface of the first lens 1, R3 is a radius of the object side surface of the second lens 2, R4 is a radius of the image side surface of the second lens 2, R5 is a radius of the object side surface of the third lens 3, R6 is a radius of the image side surface of the third lens 3, R7 is a radius of the object side surface of the fourth lens 4, R8 is a radius of the image side surface of the fourth lens 4, R9 is a radius of the object side surface of the fifth lens 5, R10 is a radius of the image side surface of the fifth lens 5, R11 is a radius of the object side surface of the sixth lens 6, R12 is a radius of the image side surface of the sixth lens 6, R13 is a radius of the object side surface of the seventh lens 7, and R14 is a radius of the image side surface of the seventh lens 7.

It should be noted that 8.6 mm<R1<23 mm, and the object side surface of the first lens 1 is convex, so that a ghost image-like stray light can be effectively avoided, and the dispersion can be effectively suppressed by using a lens with low refractive index.

Further, the optical lens satisfies the following relational expressions:

−3 mm<f1<−4.5 mm;15.3 mm<f2<23.3 mm,22.6
  mm<f3<34.4 mm,1.7 mm<f4<2.6 mm,−4.8
  mm<f5<−7.3 mm,1.6 mm<f6<2.5 mm,−1.8
  mm<f7<−2.8 mm, where f1 is a focal length of the first lens 1, f2 is a focal length of the second lens 2, f3 is a focal length of the third lens 3, f4 is a focal length of the fourth lens 4, f5 is a focal length of the fifth lens 5, f6 is a focal length of the sixth lens 6, and f7 is a focal length of the seventh lens 7; and the optical lens further includes an aperture arranged between the third lens 3 and the fourth lens 4.

It should be noted that the aperture 9 is arranged between the third lens 3 and the fourth lens 4, to effectively control an aberration and to be of good manufacturing sensitivity, that is, to have a relatively large field of view and image height size.

The optical module herein including the optical lens includes a light filter 10 which is located between the seventh lens 7 and the photosensitive element 8. The light filter 10 may be an infrared light filter, which is suitable for the photosensitive element 8 with a diagonal length from 8.0 mm to 8.4 mm for effective imaging, and is suitable for visible light with a wavelength range from 400 nm to 700 nm.

Further, the optical lens satisfies the following relational expressions:

0.6 mm<CT1<0.8 mm;0.6 mm<CT2<0.8 mm,0.3
  mm<CT3<0.4 mm,0.7 mm<CT4<1 mm,0.3
  mm<CT5<0.4 mm,0.7 mm<CT6<1 mm,0.4
  mm<CT7<0.6 mm, where CT1 is a central thickness of the first lens 1 on the optical axis, CT2 is a central thickness of the second lens 2 on the optical axis, CT3 is a central thickness of the third lens 3 on the optical axis, CT4 is a central thickness of the fourth lens 4 on the optical axis, CT5 is a central thickness of the fifth lens 5 on the optical axis, CT6 is a central thickness of the sixth lens 6 on the optical axis, and CT7 is a central thickness of the seventh lens 7 on the optical axis.

Figure 8:
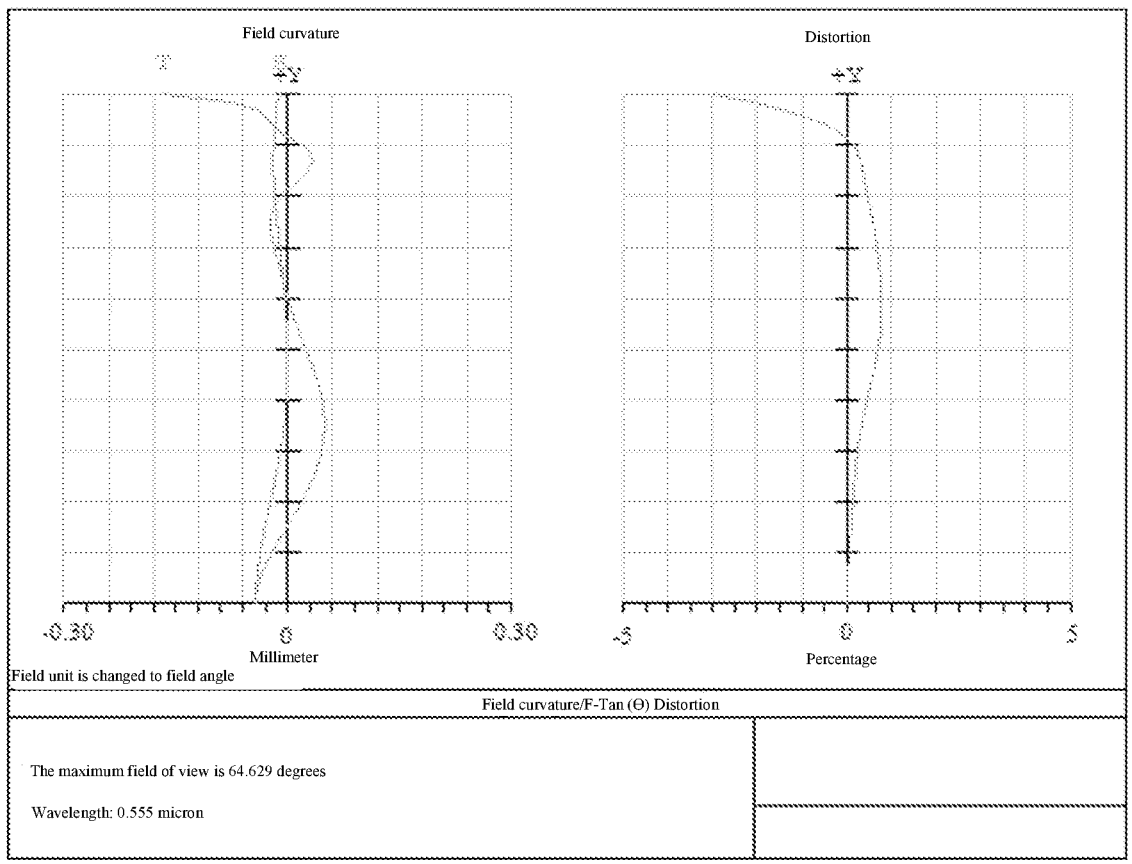
FIG. 8 is a third schematic diagram of a field curvature/distortion curve of an optical lens according to an embodiment of this application.
Figure 9:
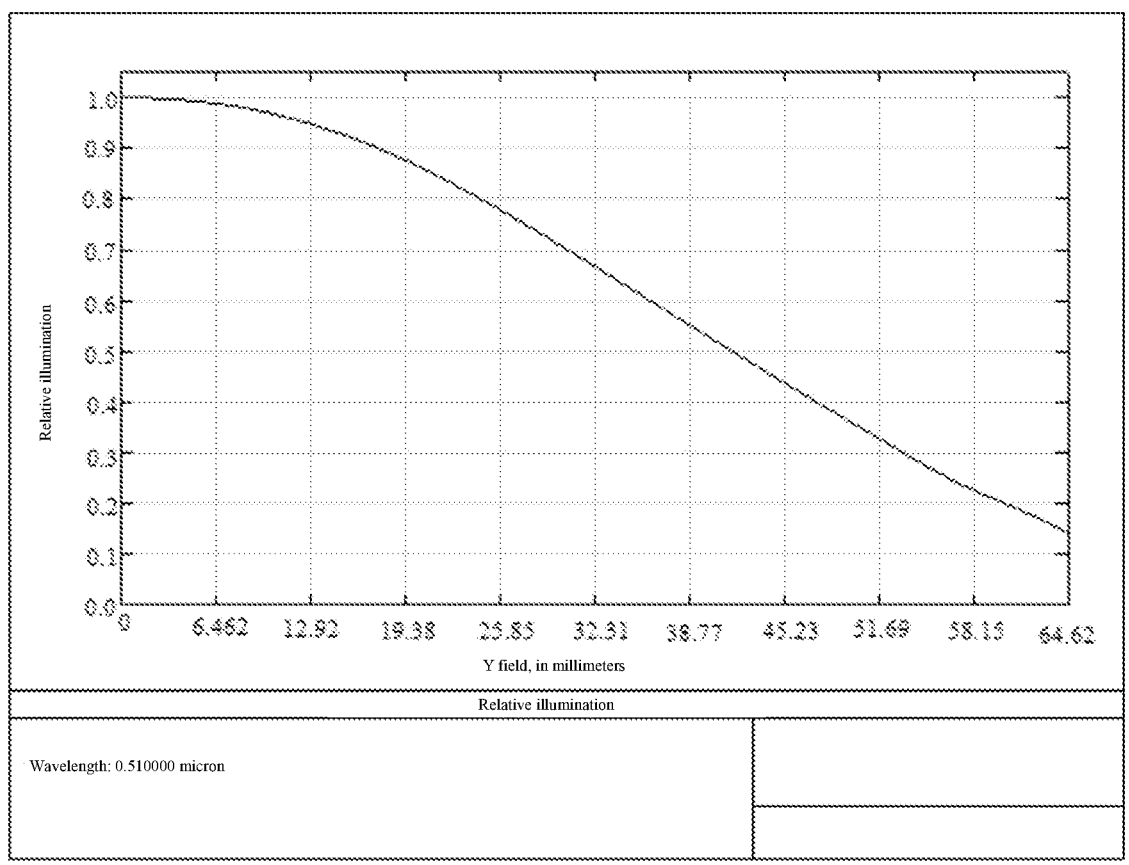
FIG. 9 is a third curve chart of a relative illumination of an optical lens according to an embodiment of this application.
Figure 10:
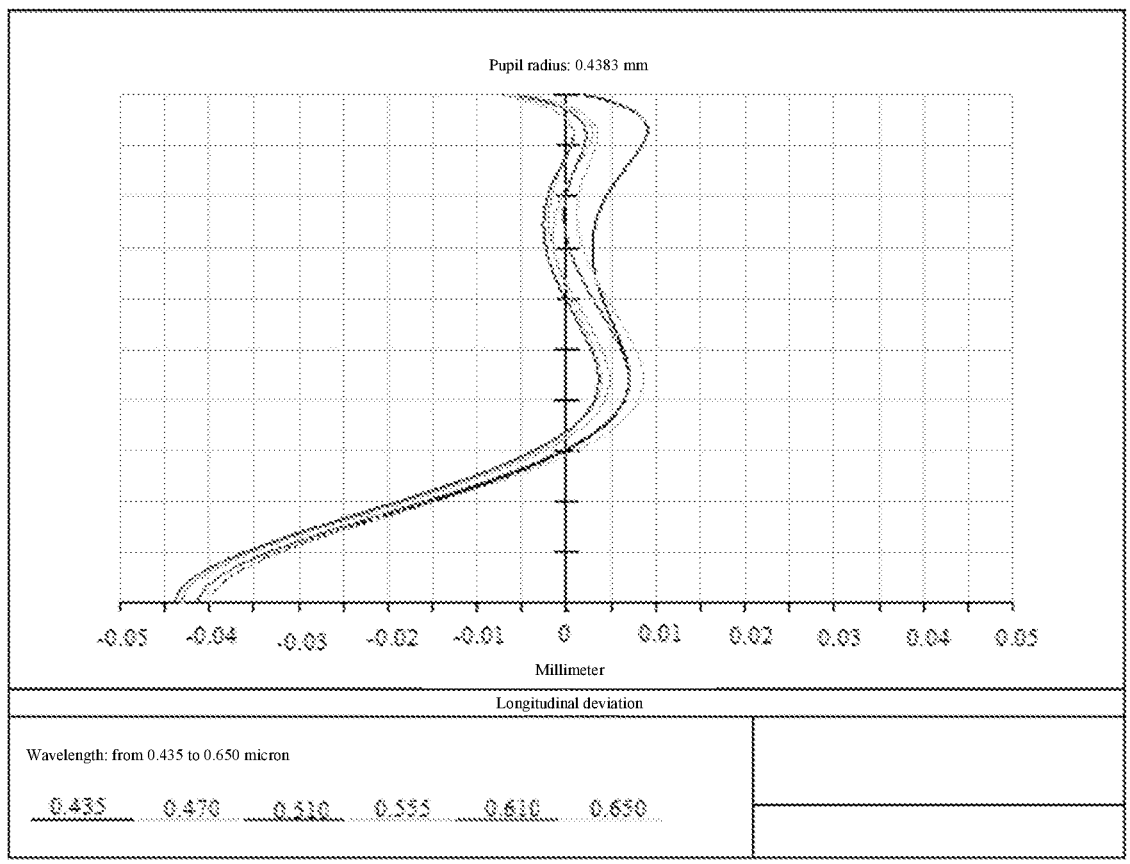
FIG. 10 is a third curve chart of a longitudinal deviation of an optical lens according to an embodiment of this application.

In this implementation, an optical lens meeting the foregoing size range is adopted with a small optical distortion. Specifically, −3.5%<Optical distortion<1%, which is corresponding to the field of view distortion diagram shown in FIG. 8. Relative illumination>13.4%, as shown in FIG. 9. See FIG. 10 for on-axis chromatic aberration, HFOV=117 degrees, F2.2, 1.9 mm<focal length EFL<2.2 mm.

An aspheric equation used is as follows, and parameters in specific implementation are shown in Table 4 in mm. Conic is a value of k in the aspheric equation.

TABLE 4

$$z = \frac{cr^2}{1+\sqrt{1-(1+k)c^2r^2}} + \sum_{i=1}^{N}\alpha_i\rho^{2i}$$

| Annotation | Curvature radius | Thickness | Radius | Conic | Material Nd/Abbe |
|---|---|---|---|---|---|
| Lens 1 | 14.899 | 0.610 | 3.247 | 18.263 | 1.54/55.98 |
| | 1.617 | 0.723 | 1.704 | −1.506 | |
| Lens 2 | 3.400 | 0.616 | 1.549 | 1.798 | 1.67/19.24 |

TABLE 4-continued

|  | | | | | |
|---|---|---|---|---|---|
|  | 4.417 | 0.414 | 1.086 | 7.257 | |
| Lens 3 | 4.555 | 0.346 | 0.955 | −27.132 | 1.54/55.98 |
|  | 6.548 | 0.190 | 0.809 | −102.557 | |
| Aperture |  | −0.067 | 0.636 | | |
| Lens 4 | 3.246 | 0.818 | 0.700 | 3.585 | 1.54/55.98 |
|  | −1.423 | 0.041 | 0.920 | −20.417 | |
| Lens 5 | 7.965 | 0.344 | 0.982 | 21.713 | 1.67/19.24 |
|  | 2.479 | 0.685 | 1.343 | −4.233 | |
| Lens 6 | −3.552 | 0.815 | 1.690 | −1.403 | 1.54/55.98 |
|  | −0.847 | 0.050 | 1.993 | 4.241 | |
| Lens 7 | 2.773 | 0.488 | 2.989 | −0.252 | 1.64/23.53 |
|  | 0.843 | 0.654 | 3.248 | −5.886 | |
| Light filter |  | 0.210 | 4.017 | | |

| A4 | A6 | A8 | A10 | A12 | A14 | A16 |
|---|---|---|---|---|---|---|
| 1.6717E−03 | 2.2316E−03 | −6.0726E−04 | 8.3211E−05 | −5.7889E−06 | 1.6764E−07 | 1.4820E−10 |
| 2.4451E−02 | 4.2097E−03 | 2.2202E−02 | −1.1083E−02 | 3.6529E−03 | −6.0279E−04 | −5.6906E−07 |
| 4.0471E−02 | 1.7912E−02 | −1.2223E−02 | 1.6447E−02 | −1.0983E−02 | 1.8801E−03 | 6.6582E−05 |
| 1.3842E−01 | −3.5595E−02 | 1.4150E−01 | −1.7196E−01 | 7.0048E−02 | 3.7162E−03 | −1.7473E−03 |
| −1.6975E−03 | −1.3339E−01 | −1.5762E−01 | 3.3418E−01 | −2.0899E−01 | −1.6708E−02 | 6.3973E−02 |
| −1.0898E−03 | −1.3797E−01 | −3.1083E−01 | 1.0694E+00 | −1.2872E+00 | 6.4562E−01 | 1.0557E−01 |
| 7.8356E−02 | −1.9178E−01 | 5.2708E−01 | −1.0584E+00 | 7.6979E−01 | 8.3740E−02 | 7.2447E−02 |
| −4.6447E−01 | 8.9493E−01 | −1.2958E+00 | 1.0158E+00 | 4.0659E−01 | 5.5474E−02 | −4.3682E−02 |
| 1.2647E−02 | −7.4070E−01 | 2.0012E+00 | −3.2776E+00 | 2.8035E+00 | −1.0576E+00 | −1.8175E−02 |
| −1.0752E−01 | 6.3542E−02 | −3.5757E−02 | 9.2411E−03 | −1.3824E−01 | 5.2651E−04 | −1.2139E−04 |
| 5.4769E−02 | −3.3510E−02 | 7.5609E−03 | 5.6161E−04 | −1.1805E−04 | 6.5109E−05 | −1.3057E−05 |
| −9.6885E−02 | 8.4793E−02 | −4.2704E−02 | 1.5663E−02 | −3.2564E−03 | 2.6337E−04 | 7.8935E−07 |
| −1.3193E−01 | 3.3434E−02 | −5.7303E−03 | 7.0492E−04 | −6.6499E−05 | 4.2679E−06 | −1.3160E−07 |
| −5.2675E−02 | 1.3235E−02 | −2.4737E−03 | 2.7234E−04 | −1.4633E−05 | 8.5501E−08 | 1.4699E−08 |

It should be noted that in the foregoing table, Lens 1 specifically refers to the first lens 1, Lens 2 specifically refers to the second lens 2, Lens 3 specifically refers to the third lens 3, Lens 4 specifically refers to the fourth lens 4, Lens 5 specifically refers to the fifth lens 5, Lens 6 specifically refers to the sixth lens 6, and Lens 7 specifically refers to the seventh lens 7.

Optionally, the first lens 1, the second lens 2, the third lens 3, the fourth lens 4, the fifth lens 5, the sixth lens 6, and the seventh lens 7 are all aspheric lenses.

The optical lens in the embodiments of this application sequentially includes, from an object side to an image side along an optical axis: a first lens with a negative bending force, where an object side surface of the first lens is convex, and an image side surface of the first lens is concave; a second lens with a positive bending force, where an object side surface of the second lens is convex, and an image side surface of the second lens is concave; a third lens with a positive bending force, where an object side surface of the third lens is convex, and an image side surface of the third lens is concave; a fourth lens with a positive bending force, where both an object side surface and an image side surface of the fourth lens are convex; a fifth lens with a negative bending force, where both an object side surface and an image side surface of the fifth lens are concave; a sixth lens with a positive bending force, where an object side surface of the sixth lens is concave, and an image side surface of the sixth lens is convex; and a seventh lens with a negative bending force, where an object side surface of the seventh lens includes a first bending portion and a second bending portion, the first bending portion and the second bending portion are connected to form a convex surface, and an image side surface of the seventh lens includes a third bending portion and a fourth bending portion, and the third bending portion and the fourth bending portion are connected to form a concave surface. In this way, the optical lens with the above structure can satisfy the requirements on the equivalent focal length and the size of the photosensitive element at the same time, and the optical lens can be used to shoot a picture with large angle of view and high image quality, thus meeting shooting requirements of the user.

An embodiment of this application further provides an optical module, including the optical lens described in the foregoing embodiment; a photosensitive element 8; and a light filter 10 arranged between a seventh lens 7 of the optical lens and the photosensitive element 8.

Optionally, a long diagonal line of the photosensitive element 8 is greater than or equal to 1/2.0 inch, and an equivalent focal length of the optical lens is greater than or equal to 11 mm and less than or equal to 12 mm. In this way, it can be ensured that the optical module can have a shorter equivalent focal length and a larger photosensitive element at the same time.

An embodiment of this application further provides an electronic device, including the optical module as described above.

It should be noted that, in this specification, the terms "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

The foregoing descriptions are merely the preferred implementations of the present disclosure. It should be noted that those of ordinary skill in the art may further make several improvements and refinements without departing from the principles described in the present disclosure, and these improvements and refinements also fall within the protection scope of the present disclosure.

The invention claimed is:

1. An optical lens, sequentially comprising, from an object side to an image side along an optical axis:
    a first lens with a negative bending force, wherein an object side surface of the first lens is convex, and an image side surface of the first lens is concave;
    a second lens with a positive bending force, wherein an object side surface of the second lens is convex, and an image side surface of the second lens is concave;
    a third lens with a positive bending force, wherein an object side surface of the third lens is convex, and an image side surface of the third lens is concave;
    a fourth lens with a positive bending force, wherein both an object side surface and an image side surface of the fourth lens are convex;
    a fifth lens with a negative bending force, wherein both an object side surface and an image side surface of the fifth lens are concave;
    a sixth lens with a positive bending force, wherein an object side surface of the sixth lens is concave, and an image side surface of the sixth lens is convex;
    a seventh lens with a negative bending force, wherein an object side surface of the seventh lens comprises a first bending portion and a second bending portion, the first bending portion and the second bending portion are connected to form a convex surface, and an image side surface of the seventh lens comprises a third bending portion and a fourth bending portion, and the third bending portion and the fourth bending portion are connected to form a concave surface;
    the optical lens satisfies the following relational expressions:

$0.7 < V1/V2 < 5.2$;

$0.1 < V2/V3 < 0.6$;

$0.2 < V3/V4 < 1.8$;

$0.7 < V4/V5 < 5.2$;

$0.1 < V5/V6 < 0.6$;

$0.6 < V6/V7 < 4.2$; and $N1 < N2, N2 > N3, N4 < N5, N6 < N5, N6 < N7$, wherein

V1 is a dispersion coefficient of the first lens, V2 is a dispersion coefficient of the second lens, V3 is a dispersion coefficient of the third lens, V4 is a dispersion coefficient of the fourth lens, V5 is a dispersion coefficient of the fifth lens, V6 is a dispersion coefficient of the sixth lens, V7 is a dispersion coefficient of the seventh lens, N1 is a refractive index of the first lens, N2 is a refractive index of the second lens, N3 is a refractive index of the third lens, N4 is a refractive index of the fourth lens, N5 is a refractive index of the fifth lens, N6 is a refractive index of the sixth lens, and N7 is a refractive index of the seventh lens.

2. The optical lens according to claim 1, wherein the optical lens satisfies the following relational expressions:

8.6 mm<R1<23.1 mm, 0.9 mm<R2<2.5 mm;

2.0 mm<R3<5.3 mm, 2.6 mm<R4<7.0 mm;

2.5 mm<R5<6.8 mm, 4.0 mm<R6<10.7 mm;

1.9 mm<R7<5.2 mm, −0.8 mm<R8<−2.2 mm;

3.8 mm<R9<10.2 mm, 1.4 mm<R10<3.6 mm;

−2.1 mm<R11<−5.7 mm, −0.5 mm<R12<−1.3 mm; and 1.6 mm<R13<4.2 mm, 0.5 mm<R14<1.3 mm, wherein R1 is a radius of the object side surface of the first lens, R2 is a radius of the image side surface of the first lens, R3 is a radius of the object side surface of the second lens, R4 is a radius of the image side surface of the second lens, R5 is a radius of the object side surface of the third lens, R6 is a radius of the image side surface of the third lens, R7 is a radius of the object side surface of the fourth lens, R8 is a radius of the image side surface of the fourth lens, R9 is a radius of the object side surface of the fifth lens, R10 is a radius of the image side surface of the fifth lens, R11 is a radius of the object side surface of the sixth lens, R12 is a radius of the image side surface of the sixth lens, R13 is a radius of the object side surface of the seventh lens, and R14 is a radius of the image side surface of the seventh lens.

3. The optical lens according to claim 2, wherein the optical lens satisfies the following relational expressions:

−2.9 mm<f1<−4.4 mm; 15 mm<f2<22.8 mm, 18.5 mm<f3<28.1 mm, 1.7 mm<f4<2.6 mm, −4.8 mm<f5<−7.4 mm, 1.6 mm<f6<2.4 mm, −1.7 mm<f7<−2.6 mm, wherein f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, and f7 is a focal length of the seventh lens; and
the optical lens further comprises an aperture arranged between the third lens and the fourth lens.

4. The optical lens according to claim 2, wherein the optical lens satisfies the following relational expressions:

0.6 mm<CT1<0.8 mm, 0.5 mm<CT2<0.8 mm, 0.3 mm<CT3<0.4 mm, 0.8 mm<CT4<1.1 mm, 0.3 mm<CT5<0.4 mm, 0.8 mm<CT6<1.0 mm, 0.4 mm<CT7<0.5 mm, wherein CT1 is a central thickness of the first lens on the optical axis, CT2 is a central thickness of the second lens on the optical axis, CT3 is a central thickness of the third lens on the optical axis, CT4 is a central thickness of the fourth lens on the optical axis, CT5 is a central thickness of the fifth lens on the optical axis, CT6 is a central thickness of the sixth lens on the optical axis, and CT7 is a central thickness of the seventh lens on the optical axis.

5. The optical lens according to claim 1, wherein the optical lens satisfies the following relational expressions:

4.1 mm<R1<11 mm, 0.9 mm<R2<2.4 mm;

2.2 mm<R3<5.8 mm, 2.6 mm<R4<7.1 mm;

2.5 mm<R5<6.7 mm, 4.2 mm<R6<11.2 mm;

2.0 mm<R7<5.4 mm, −0.8 mm<R8<−2.1 mm;

4.0 mm<R9<10.6 mm,1.4 mm<R10<3.6 mm;

−1.7 mm<R11<−4.6 mm,−0.5 mm<R12<−1.3 mm; and 1.6 mm<R13<4.4 mm,0.5 mm<R14<1.2 mm, wherein R1 is a radius of the object side surface of the first lens, R2 is a radius of the image side surface of the first lens, R3 is a radius of the object side surface of the second lens, R4 is a radius of the image side surface of the second lens, R5 is a radius of the object side surface of the third lens, R6 is a radius of the image side surface of the third lens, R7 is a radius of the object side surface of the fourth lens, R8 is a radius of the image side surface of the fourth lens, R9 is a radius of the object side surface of the fifth lens, R10 is a radius of the image side surface of the fifth lens, R11 is a radius of the object side surface of the sixth lens, R12 is a radius of the image side surface of the sixth lens, R13 is a radius of the object side surface of the seventh lens, and R14 is a radius of the image side surface of the seventh lens.

6. The optical lens according to claim 5, wherein the optical lens satisfies the following relational expressions:

−3.3 mm<f1<−5.1 mm;21.6 mm<f2<32.9 mm,16.7 mm<f3<25.5 mm, 1.7 mm<f4<2.6 mm,−4.8 mm<f5<−7.3 mm,1.6 mm<f6<2.4 mm,−1.7 mm<f7<−2.5 mm, wherein f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, and f7 is a focal length of the seventh lens; and the optical lens further comprises an aperture arranged between the third lens and the fourth lens.

7. The optical lens according to claim 5, wherein the optical lens satisfies the following relational expressions:

0.3 mm<CT1<0.5 mm;0.5 mm<CT2<0.7 mm,0.3 mm<CT3<0.4 mm,0.8 mm<CT4<1.1 mm,0.3 mm<CT5<0.4 mm,0.8 mm<CT6<1.1 mm,0.4 mm<CT7<0.6 mm, wherein CT1 is a central thickness of the first lens on the optical axis, CT2 is a central thickness of the second lens on the optical axis, CT3 is a central thickness of the third lens on the optical axis, CT4 is a central thickness of the fourth lens on the optical axis, CT5 is a central thickness of the fifth lens on the optical axis, CT6 is a central thickness of the sixth lens on the optical axis, and CT7 is a central thickness of the seventh lens on the optical axis.

8. The optical lens according to claim 1, wherein the optical lens satisfies the following relational expressions:

8.6 mm<R1<23 mm,0.9 mm<R2<2.5 mm;

2.0 mm<R3<5.2 mm,2.5 mm<R4<6.8 mm;

2.6 mm<R5<7 mm,3.8 mm<R6<10.1 mm;

1.9 mm<R7<5 mm,−0.8 mm<R8<−2.2 mm;

4.6 mm<R9<12.3 mm,1.4 mm<R10<3.8 mm;

−2 mm<R11<−5.5 mm,−0.5 mm<R12<−1.3 mm; and 1.6 mm<R13<4.3 mm,0.5 mm<R14<1.3 mm, wherein R1 is a radius of the object side surface of the first lens, R2 is a radius of the image side surface of the first lens, R3 is a radius of the object side surface of the second lens, R4 is a radius of the image side surface of the second lens, R5 is a radius of the object side surface of the third lens, R6 is a radius of the image side surface of the third lens, R7 is a radius of the object side surface of the fourth lens, R8 is a radius of the image side surface of the fourth lens, R9 is a radius of the object side surface of the fifth lens, R10 is a radius of the image side surface of the fifth lens, R11 is a radius of the object side surface of the sixth lens, R12 is a radius of the image side surface of the sixth lens, R13 is a radius of the object side surface of the seventh lens, and R14 is a radius of the image side surface of the seventh lens.

9. The optical lens according to claim 8, wherein the optical lens satisfies the following relational expressions:

−3 mm<f1<−4.5 mm;15.3 mm<f2<23.3 mm,22.6 mm<f3<34.4 mm,1.7 mm<f4<2.6 mm,−4.8 mm<f5<−7.3 mm,1.6 mm<f6<2.5 mm,−1.8 mm<f7<−2.8 mm, wherein f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, and f7 is a focal length of the seventh lens; and the optical lens further comprises an aperture arranged between the third lens and the fourth lens.

10. The optical lens according to claim 8, wherein the optical lens satisfies the following relational expressions:

0.6 mm<CT1<0.8 mm;0.6 mm<CT2<0.8 mm,0.3 mm<CT3<0.4 mm,0.7 mm<CT4<1 mm,0.3 mm<CT5<0.4 mm,0.7 mm<CT6<1 mm,0.4 mm<CT7<0.6 mm, wherein CT1 is a central thickness of the first lens on the optical axis, CT2 is a central thickness of the second lens on the optical axis, CT3 is a central thickness of the third lens on the optical axis, CT4 is a central thickness of the fourth lens on the optical axis, CT5 is a central thickness of the fifth lens on the optical axis, CT6 is a central thickness of the sixth lens on the optical axis, and CT7 is a central thickness of the seventh lens on the optical axis.

11. The optical lens according to claim 1, wherein the first lens, the second lens, the third lens, the fourth lens, the fifth lens, the sixth lens, and the seventh lens are all aspheric lenses.

12. An optical module, comprising:
an optical lens;
a photosensitive element; and
a light filter arranged between a seventh lens of the optical lens and the photosensitive element;
wherein the optical lens, sequentially comprising, from an object side to an image side along an optical axis:
a first lens with a negative bending force, wherein an object side surface of the first lens is convex, and an image side surface of the first lens is concave;
a second lens with a positive bending force, wherein an object side surface of the second lens is convex, and an image side surface of the second lens is concave;

a third lens with a positive bending force, wherein an object side surface of the third lens is convex, and an image side surface of the third lens is concave;
a fourth lens with a positive bending force, wherein both an object side surface and an image side surface of the fourth lens are convex;
a fifth lens with a negative bending force, wherein both an object side surface and an image side surface of the fifth lens are concave;
a sixth lens with a positive bending force, wherein an object side surface of the sixth lens is concave, and an image side surface of the sixth lens is convex;
a seventh lens with a negative bending force, wherein an object side surface of the seventh lens comprises a first bending portion and a second bending portion, the first bending portion and the second bending portion are connected to form a convex surface, and an image side surface of the seventh lens comprises a third bending portion and a fourth bending portion, and the third bending portion and the fourth bending portion are connected to form a concave surface;
the optical lens satisfies the following relational expressions:

0.7<$V1/V2$<5.2;

0.1<$V2/V3$<0.6;

0.2<$V3/V4$<1.8;

0.7<$V4/V5$<5.2;

0.1<$V5/V6$<0.6;

0.6<$V6/V7$<4.2; and $N1<N2, N2>N3, N4<N5, N6<N5, N6<N7$, wherein

V1 is a dispersion coefficient of the first lens, V2 is a dispersion coefficient of the second lens, V3 is a dispersion coefficient of the third lens, V4 is a dispersion coefficient of the fourth lens, V5 is a dispersion coefficient of the fifth lens, V6 is a dispersion coefficient of the sixth lens, V7 is a dispersion coefficient of the seventh lens, N1 is a refractive index of the first lens, N2 is a refractive index of the second lens, N3 is a refractive index of the third lens, N4 is a refractive index of the fourth lens, N5 is a refractive index of the fifth lens, N6 is a refractive index of the sixth lens, and N7 is a refractive index of the seventh lens.

13. The optical module according to claim 12, wherein the optical lens satisfies the following relational expressions:

8.6 mm<$R1$<23.1 mm, 0.9 mm<$R2$<2.5 mm;

2.0 mm<$R3$<5.3 mm, 2.6 mm<$R4$<7.0 mm;

2.5 mm<$R5$<6.8 mm, 4.0 mm<$R6$<10.7 mm;

1.9 mm<$R7$<5.2 mm, −0.8 mm<$R8$<−2.2 mm;

3.8 mm<$R9$<10.2 mm, 1.4 mm<$R10$<3.6 mm;

−2.1 mm<$R11$<−5.7 mm, −0.5 mm<$R12$<−1.3 mm; and 1.6 mm<$R13$<4.2 mm, 0.5 mm<$R14$<1.3 mm, wherein R1 is a radius of the object side surface of the first lens, R2 is a radius of the image side surface of the first lens, R3 is a radius of the object side surface of the second lens, R4 is a radius of the image side surface of the second lens, R5 is a radius of the object side surface of the third lens, R6 is a radius of the image side surface of the third lens, R7 is a radius of the object side surface of the fourth lens, R8 is a radius of the image side surface of the fourth lens, R9 is a radius of the object side surface of the fifth lens, R10 is a radius of the image side surface of the fifth lens, R11 is a radius of the object side surface of the sixth lens, R12 is a radius of the image side surface of the sixth lens, R13 is a radius of the object side surface of the seventh lens, and R14 is a radius of the image side surface of the seventh lens.

14. The optical module according to claim 13, wherein the optical lens satisfies the following relational expressions:

−2.9 mm<$f1$<−4.4 mm; 15 mm<$f2$<22.8 mm, 18.5 mm<$f3$<28.1 mm, 1.7 mm<$f4$<2.6 mm, −4.8 mm<$f5$<−7.4 mm, 1.6 mm<$f6$<2.4 mm, −1.7 mm<$f7$<−2.6 mm, wherein f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, and f7 is a focal length of the seventh lens; and
the optical lens further comprises an aperture arranged between the third lens and the fourth lens.

15. The optical module according to claim 13, wherein the optical lens satisfies the following relational expressions:

0.6 mm<CT1<0.8 mm, 0.5 mm<CT2<0.8 mm, 0.3 mm<CT3<0.4 mm, 0.8 mm<CT4<1.1 mm, 0.3 mm<CT5<0.4 mm, 0.8 mm<CT6<1.0 mm, 0.4 mm<CT7<0.5 mm, wherein CT1 is a central thickness of the first lens on the optical axis, CT2 is a central thickness of the second lens on the optical axis, CT3 is a central thickness of the third lens on the optical axis, CT4 is a central thickness of the fourth lens on the optical axis, CT5 is a central thickness of the fifth lens on the optical axis, CT6 is a central thickness of the sixth lens on the optical axis, and CT7 is a central thickness of the seventh lens on the optical axis.

16. The optical module according to claim 12, wherein the optical lens satisfies the following relational expressions:

4.1 mm<$R1$<11 mm, 0.9 mm<$R2$<2.4 mm;

2.2 mm<$R3$<5.8 mm, 2.6 mm<$R4$<7.1 mm;

2.5 mm<$R5$<6.7 mm, 4.2 mm<$R6$<11.2 mm;

2.0 mm<$R7$<5.4 mm, −0.8 mm<$R8$<−2.1 mm;

4.0 mm<$R9$<10.6 mm, 1.4 mm<$R10$<3.6 mm;

−1.7 mm<$R11$<−4.6 mm, −0.5 mm<$R12$<−1.3 mm; and 1.6 mm<$R13$<4.4 mm, 0.5 mm<$R14$<1.2 mm, wherein R1 is a radius of the object side surface of the first lens, R2 is a radius of the image side surface of the first lens, R3 is a radius of the object side surface of the second lens, R4 is a radius of the image side surface of the second lens, R5 is a radius of the object side surface of the third lens, R6 is a radius of the image side surface of the third lens, R7 is a radius of the object side surface of the fourth lens, R8 is a radius of the image side surface of the fourth lens, R9 is a radius of the object side surface of the fifth lens, R10 is a radius of the image side surface of the fifth lens, R11 is a radius of the object side surface of the sixth lens, R12 is a radius of the image side surface of the sixth lens, R13 is a radius of the object side surface of the seventh lens, and R14 is a radius of the image side surface of the seventh lens.

17. The optical module according to claim 12, wherein the optical lens satisfies the following relational expressions:

$$8.6 \text{ mm} < R1 < 23 \text{ mm}, 0.9 \text{ mm} < R2 < 2.5 \text{ mm};$$

$$2.0 \text{ mm} < R3 < 5.2 \text{ mm}, 2.5 \text{ mm} < R4 < 6.8 \text{ mm};$$

$$2.6 \text{ mm} < R5 < 7 \text{ mm}, 3.8 \text{ mm} < R6 < 10.1 \text{ mm};$$

$$1.9 \text{ mm} < R7 < 5 \text{ mm}, -0.8 \text{ mm} < R8 < -2.2 \text{ mm};$$

$$4.6 \text{ mm} < R9 < 12.3 \text{ mm}, 1.4 \text{ mm} < R10 < 3.8 \text{ mm};$$

$$-2 \text{ mm} < R11 < -5.5 \text{ mm}, -0.5 \text{ mm} < R12 < -1.3 \text{ mm}; \text{ and}$$

$$1.6 \text{ mm} < R13 < 4.3 \text{ mm}, 0.5 \text{ mm} < R14 < 1.3 \text{ mm},$$

wherein

R1 is a radius of the object side surface of the first lens, R2 is a radius of the image side surface of the first lens, R3 is a radius of the object side surface of the second lens, R4 is a radius of the image side surface of the second lens, R5 is a radius of the object side surface of the third lens, R6 is a radius of the image side surface of the third lens, R7 is a radius of the object side surface of the fourth lens, R8 is a radius of the image side surface of the fourth lens, R9 is a radius of the object side surface of the fifth lens, R10 is a radius of the image side surface of the fifth lens, R11 is a radius of the object side surface of the sixth lens, R12 is a radius of the image side surface of the sixth lens, R13 is a radius of the object side surface of the seventh lens, and R14 is a radius of the image side surface of the seventh lens.

18. The optical module according to claim 12, wherein the first lens, the second lens, the third lens, the fourth lens, the fifth lens, the sixth lens, and the seventh lens are all aspheric lenses.

19. The optical module according to claim 12, wherein a long diagonal line of the photosensitive element is greater than or equal to 1/2.0 inch, and an equivalent focal length of the optical lens is greater than or equal to 11 mm and less than or equal to 12 mm.

20. An electronic device, comprising an optical module; wherein the optical module, comprising:
an optical lens;
a photosensitive element; and
a light filter arranged between a seventh lens of the optical lens and the photosensitive element;
wherein the optical lens, sequentially comprising, from an object side to an image side along an optical axis:
a first lens with a negative bending force, wherein an object side surface of the first lens is convex, and an image side surface of the first lens is concave;
a second lens with a positive bending force, wherein an object side surface of the second lens is convex, and an image side surface of the second lens is concave;
a third lens with a positive bending force, wherein an object side surface of the third lens is convex, and an image side surface of the third lens is concave;
a fourth lens with a positive bending force, wherein both an object side surface and an image side surface of the fourth lens are convex;
a fifth lens with a negative bending force, wherein both an object side surface and an image side surface of the fifth lens are concave;
a sixth lens with a positive bending force, wherein an object side surface of the sixth lens is concave, and an image side surface of the sixth lens is convex;
a seventh lens with a negative bending force, wherein an object side surface of the seventh lens comprises a first bending portion and a second bending portion, the first bending portion and the second bending portion are connected to form a convex surface, and an image side surface of the seventh lens comprises a third bending portion and a fourth bending portion, and the third bending portion and the fourth bending portion are connected to form a concave surface;
the optical lens satisfies the following relational expressions:

$$0.7 < V1/V2 < 5.2;$$

$$0.1 < V2/V3 < 0.6;$$

$$0.2 < V3/V4 < 1.8;$$

$$0.7 < V4/V5 < 5.2;$$

$$0.1 < V5/V6 < 0.6;$$

$$0.6 < V6/V7 < 4.2; \text{ and}$$

$$N1 < N2, N2 > N3, N4 < N5, N6 < N5, N6 < N7, \text{ wherein}$$

V1 is a dispersion coefficient of the first lens, V2 is a dispersion coefficient of the second lens, V3 is a dispersion coefficient of the third lens, V4 is a dispersion coefficient of the fourth lens, V5 is a dispersion coefficient of the fifth lens, V6 is a dispersion coefficient of the sixth lens, V7 is a dispersion coefficient of the seventh lens, N1 is a refractive index of the first lens, N2 is a refractive index of the second lens, N3 is a refractive index of the third lens, N4 is a refractive index of the fourth lens, N5 is a refractive index of the fifth lens, N6 is a refractive index of the sixth lens, and N7 is a refractive index of the seventh lens.

* * * * *